United States Patent [19]

Archibald et al.

[11] Patent Number: 4,948,996
[45] Date of Patent: Aug. 14, 1990

[54] DIRECT COOLED BORE CONNECTOR

[75] Inventors: James B. Archibald, Schenectady; Paul C. Rasmussen, Rensselaer; Kirk G. O'Brien, Schenectady, all of N.Y.

[73] Assignee: General Electric Company, Schenectady, N.Y.

[21] Appl. No.: 312,266

[22] Filed: Feb. 21, 1989

[51] Int. Cl.⁵ ............................................. H02K 9/00
[52] U.S. Cl. ......................................... 310/52; 310/45; 310/55; 310/60 A; 310/165; 310/179
[58] Field of Search ........................ 310/71, 89, 42, 43, 310/45, 165, 51, 53, 55, 57, 58, 59, 60 R, 60 A, 61, 179, 180, 68 D; 174/16.2

[56] References Cited

U.S. PATENT DOCUMENTS

| | | | |
|---|---|---|---|
| 3,353,043 | 11/1967 | Albright | 310/61 |
| 3,359,438 | 12/1967 | Hylen | 310/52 |
| 3,457,440 | 7/1969 | Horsley | 310/52 |
| 3,955,111 | 5/1976 | Weghaupt | 310/61 |
| 4,091,299 | 5/1978 | Vitchenko | 310/165 |
| 4,246,506 | 1/1981 | Vartanian | 310/165 |
| 4,471,249 | 9/1984 | Okamoto | 310/165 |

Primary Examiner—R. Skudy
Attorney, Agent, or Firm—Nixon & Vanderhye

[57] ABSTRACT

Cooling means are provided for directly cooling the bore bus bars which connect a direct current exciter such as a bore pack exciter to the field of an electric power generator. Two bore bus bars are separated by an insulating sheet have a circular cross section, and are surrounded by an insulating cylinder. The bore bus bars include an axially extending slot adjacent the insulation to form passageways through which cooling gas flows to directly cool the bus bars and pass through the generator to the cooling unit.

24 Claims, 4 Drawing Sheets

DIRECT COOLED BORE CONNECTOR

BACKGROUND OF INVENTION

This invention relates to the cooling of bus bars which connect an exciter supplying direct current (D.C.) power to the field of an electric power generator. Various exciters are used for such purpose, including brush exciters and brushless exciters with the brush exciters including carbon brushes on a collector attached to the end of the generator field. Brushless exciters include rectifier wheels and bore pack rectifier configurations. The rectifiers are assembled in the bore of the power generator field, and all of these exciters require that the bus bars carry the heavy DC current flow from the exciter to the generator field.

One configuration for bus bar connectors uses two uninsulated half round copper sections which are separated by an insulating sheet and positioned within an insulating tube. This assembly is slid into the bore of the generator field and connections are made from the ends of each bus bar to the generator field coil and exciter.

However, the heavy current flow leads to heating problems and the necessity to cool the bus bars. One method of cooling the bore bus bars utilizes a metal pipe or tube surrounding the insulated bus bars and spaced from the generator field bore by angle iron spacers welded to the outside diameter of the metal pipe or tube, such that cooling gas or air can flow in the passage between the outside of the pipe and the inside of the field bore to remove heat from the bus bars. However, the insulation and pipe are interposed between the bus bars and the cooling medium, thereby detracting from the effectiveness of the cooling.

Moreover, such arrangements add weight, size, and complexity; and an increase in the generator field bore diameter which presents a number of design problems. In addition, the clearance between the metal pipe and angle iron assembly and the generator field bore, required to enable sliding the assembly into the generator field, allows movement and noise during operation.

OBJECTS AND SUMMARY OF INVENTION

It is an object of the present invention to provide improved cooling for the bore bus bars in an integrated DC exciter and electric power generator.

It is a further object of the present invention to provide improved cooling for the bore bus bars, in an integrated DC exciter and electric power generator, which is less complex, lighter, and smaller than existing cooling arrangements.

It is a still further object of the present invention to provide improved cooling for an integrated bore pack exciter and electric power generator which exhibits decreased noise and vibration.

It is yet another object of the present invention to provide an improved bore bus bar assembly which is simple to fabricate and assemble.

In carrying out the above and other objects of the present invention, there is provided an arrangement for directly cooling the bore bus bars connecting a bore pack exciter with an electric power generator by providing passageways within the bore bus bars and means to pass a flow of cooling gas through the bus bars for return through the generator to the cooling unit.

BRIEF DESCRIPTION OF DRAWINGS

FIGS. 2A and 2B are taken in the direction of the arrows BB in FIG. 4.

Referring to FIG. 1, there is shown an electric power generator 1 having a cooling unit 2 mounted thereon, and a bore pack exciter 3 mounted on one end of the generator 1, and supported by support 4. The cooling unit 2 supplies cooling gas for flow within the electric power generator 1 to cool the interior of the generator to be returned to the cooling unit 2 for heat to be extracted and cool gas returned again to the generator. This flow path within the generator is shown schematically by the dotted arrows 6. The cooling unit 2 also supplies cooling gas through the piping 8 to one end 10 of bore pack exciter 3 where it flows through the bore pack, through the opposite end 11 of the bore pack, and through the bore bus bar assembly 14 to the interior of the power generator 1 where the bore pack cooling gas flows with the generator gas cooling flow 6 back to the cooling unit 2 where heat is removed and the cooling gas recycled back through the power generator 1 and bore pack exciter 3 in the manner described above.

FIGS. 2A, 2B and 3 show the details of the bore pack exciter 3 and bore bus bar cooling. Referring to FIGS. 2A, 2B and 3, the end 11 of the bore pack exciter 3 is shown adjacent to the bore bus bar assembly 14. Included within the housing 17 of the bore pack exciter 3 is the positive or +copper D.C. lead 18, the end of which is shown connected by mechanical connection fastener 19 through laminations 21 which is brazed to the bore bus bar or bore conductor 22 within the bore bus bar assembly 14.

Figure 1:
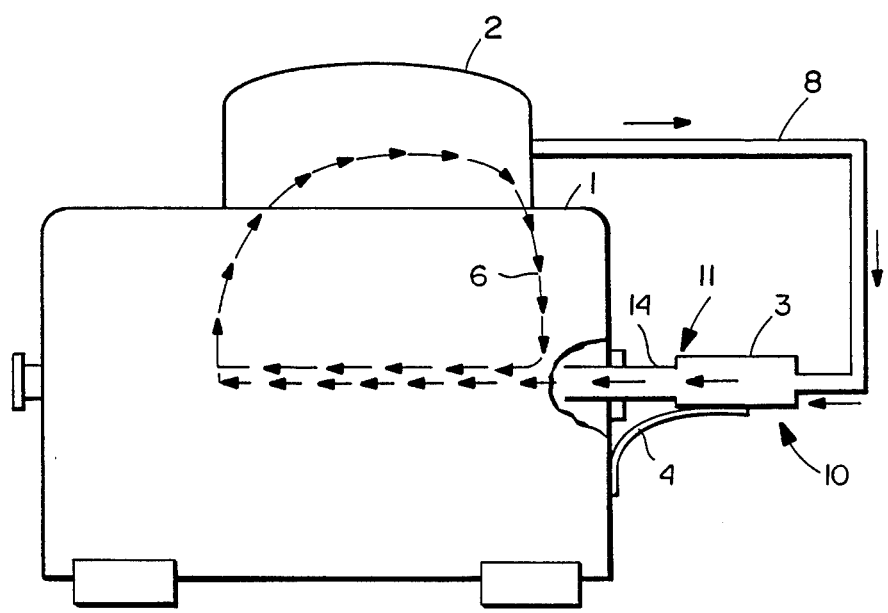
FIG. 1 is an outline drawing of an integral bore pack exciter and electric power generator embodying the present invention.

Similarly the end of the minus or — copper D.C. lead 25 is connected through mechanical connection or fastener 26 to the minus bore bus bar or bore conductor 28. The laminations 21 and positive bore bus bar 22 are separated from the laminations 27 and negative bore bus bar 28 by insulation 31. The bore pack exciter 3 contains a rectifier assembly (not shown) which converts alternating current (A.C.) to direct current (D.C.) in a manner well known in the art. The solid copper leads 18 and 25 connect the rectifier assembly through the bore bus bars 22 and 28 to provide DC power, to power the generator field coil 35. Terminal assembly 42 connects the positive bore bus bar 22 to the generator field coil 35. A second connector assembly (not shown) connects the negative bore bus bar 28 to the generator field coil 35 to provide DC current flow through the generator field coil 35.

Figure 4:
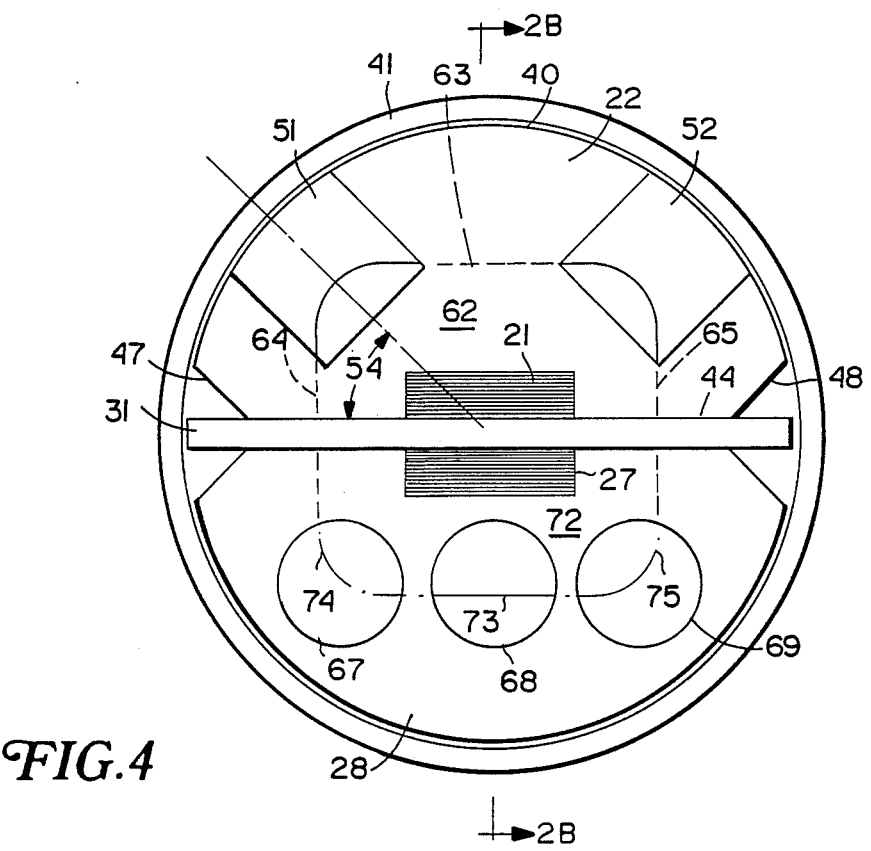
FIG. 4 is a cross section taken in the direction of the arrows AA in FIG. 2B showing alternative embodiments of the present invention. It is to be noted that in order to better illustrate the present invention.

The positive bore bus bar 22 and the negative bore bus bar 28 are shown in FIGS. 2A, 2B, 3, 4, and 5. Referring to FIGS. 2A, 2B, 3, 4, and 5, bore bus bar 22 extends axially within the bore bus bar assembly 14 and is slid into position and retained between the centrally located insulation 31 and the insulating bore tube 41 which is positioned as a sleeve within the bore of the generator shaft 38. As shown in FIG. 4, bore bus bar 22 is generally in the form of a half cylinder having a half circle cross section. The ends of the flat central portion 44 adjacent to insulating sheet 31 have notched cutout slots 47 and 48 where the circumference of the half circular cross section would otherwise have contacted the insulating sheet. These axially extending slots 47 and 48 prevent possible leakage or creepage current flow across the insulation 31 to the negative bore bus bar 28. Slots 47 and 48 eliminate what otherwise would be, pointed, closely spaced corners. A pair of generally square shaped alingated entrance slots or ports 51 and 52 approximately ⅜ inch on a side are cut along the circumference of the circular surface of the bore bus bar 22 at center angles of approximately 45 degrees indicated by arc 54 in FIG. 4. The ports 51 and 52 are connected to the central axial cutout or gas passage 62 having a top 63 parallel to insulation sheet 31, and sides 64 and 65. Ports 51 and 52 thus connect the end of the plus bore bus bar 22 to the central gas passage 62 formed between the bore copper and the insulating sheet 31.

Figure 2A:
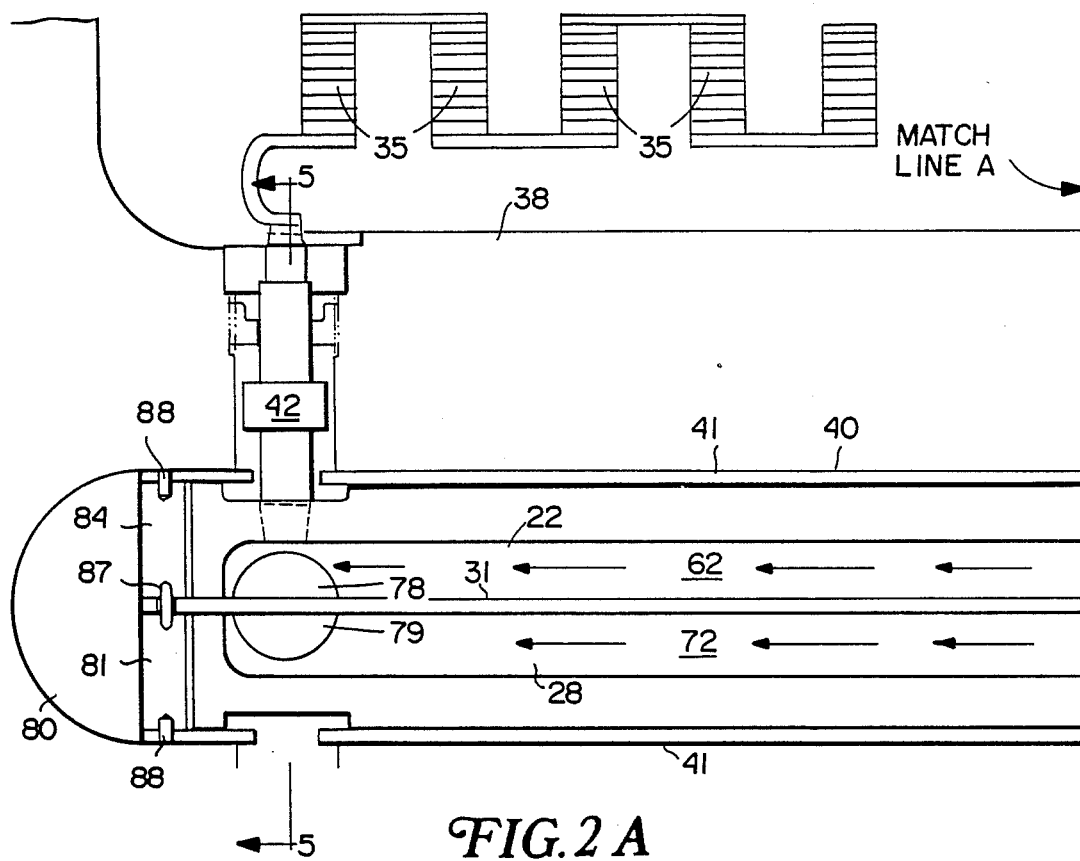
FIG. 2A and 2B are drawings of bore bus bars for connecting a bore pack exciter to an electric power generator in accordance with the present invention.
Figure 2B:
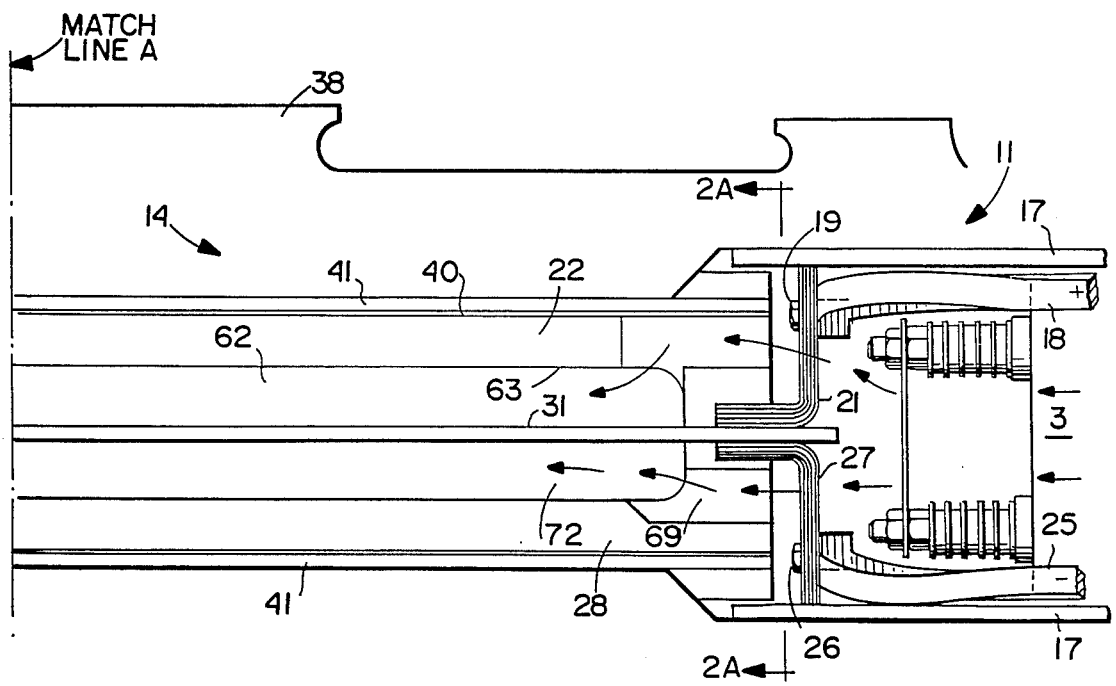
Figure 3:
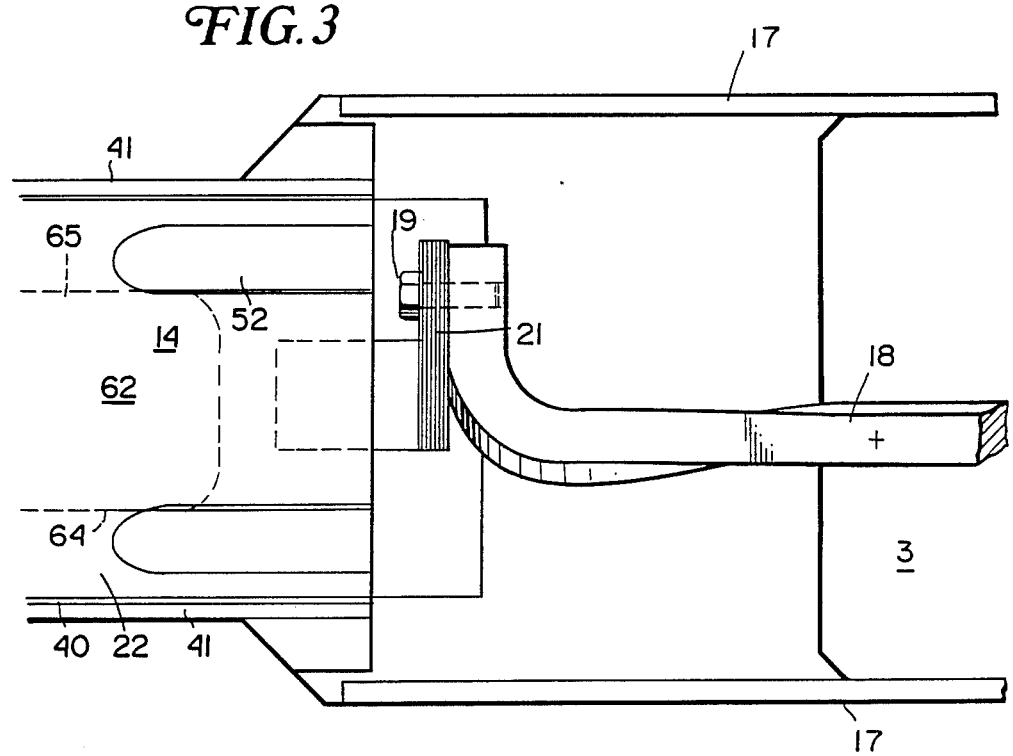
FIG. 3 is the top view of a portion of FIG. 2B.

An alternate embodiment to the slotted ports 51 and 52 is shown in bore bus bar 28 as best illustrated in FIGS. 2B and 4. Referring to FIGS. 2B and 4, three circular holes or passages 67, 68 and 69 drilled axially from the end of bore conductor 28 adjacent to the bore pack exciter 3 to connect the end to the central gas passage 72. Gas passage 72 has a generally rectangular cross section and extends axially in the bore bus bar assembly 14 between the bore bus bar 28 and the insulating sheet 31. Central cooling gas passage 72 has a bottom 73 parallel to insulation sheet 32 and sides 74 and 75. Either or both of the bore bus bar members 22 and 28 may utilize the slots 51 and 52 or alternatively the circular passages 67, 68, and 69 to connect the ends of the bore copper members to the central cooling gas passages 62 and 72.

Figure 5:
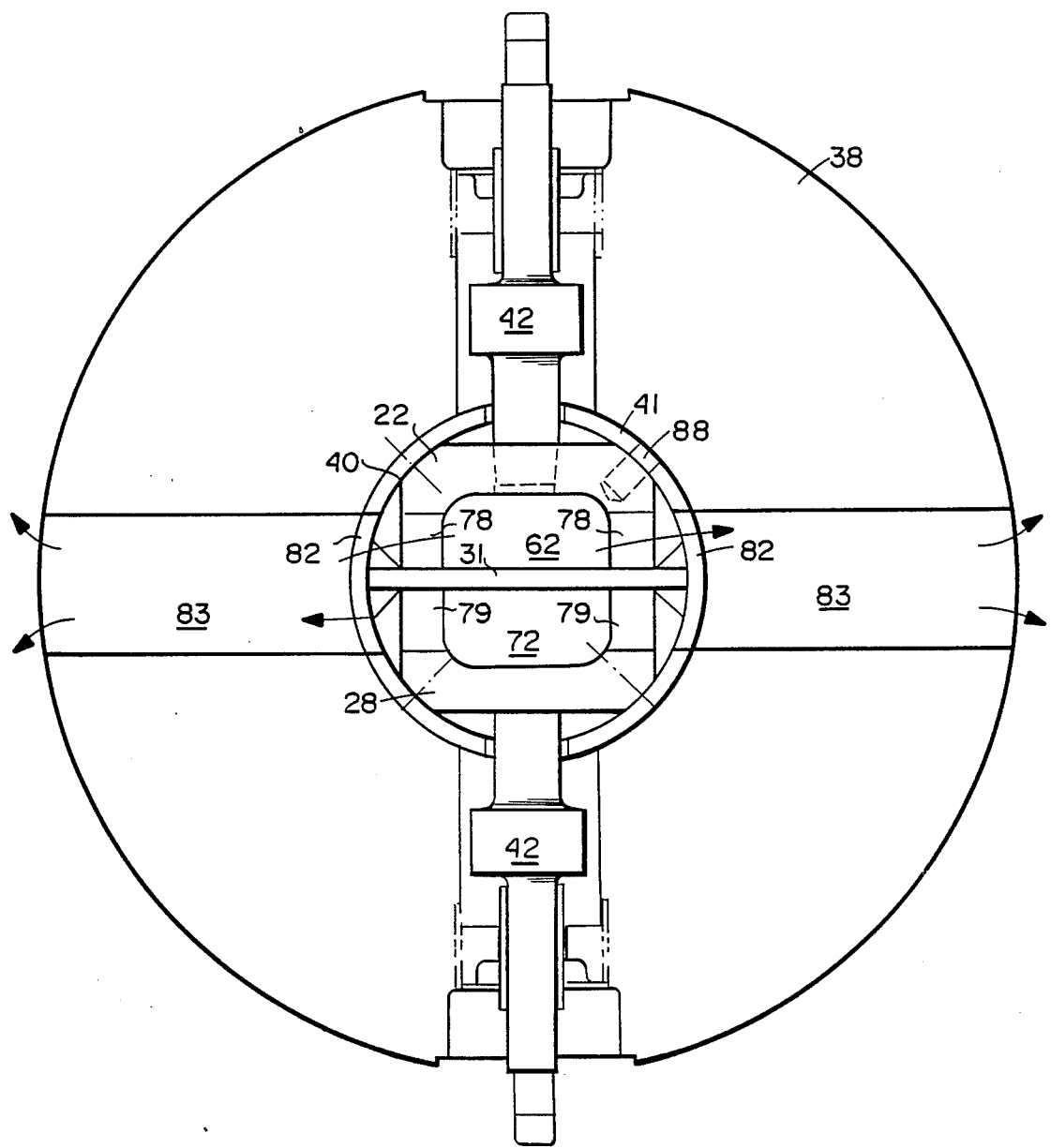
FIG. 5 is a cross section taken in the direction 5—5 in FIG. 2A.

The central gas passages 62 and 72, as best shown in FIG. 2A, extend axially along the length of the bore conductor members 22 and 28, which are approximately 30 inches long for a typical installation to connect to semicircular exit opening 78 and 79, respectively, which, as shown in FIGS. 2A and 5, are at right angles to the central gas passages 62 and, 78 located within the field shaft 38 bore hole. The end closure members, or support members 81 and 84 are fabricated of insulating material and positioned and retained in place by a pair of insulated dowels, one of which, 87, is shown. The insulation sheet 31 is positioned within the bore of the insulating bore tube 41 by support members 81 and 84 in the end portion 80 of the field shaft 38 bore hole support members 81 and 84 are held to insulated bore tube 41 by 4 dowels 88, 2 of which are shown in FIG. 2A. Gas exit passages 82 in the field shaft 38 bore allow the cooling gas to flow through the semicircular openings 78 and 79 through the gas exit passages 82 to the interior of the electric power generator 1, where the cooling gas joins that within the generator for return to the cooling unit 2 as shown by the arrows in FIG. 1.

The configuration of the bore bus bar assembly 14 in the present invention facilitates its manufacture and assembly. The bore bus bar members 22 and 28 are positioned on opposite sides of insulation sheet 31 and the dowels 87 are inserted through holes in insulation sheet 31 to extend on either side of the insulation sheet.

The end closure members 81 and 84 are secured to the insulation tube 41 by four spaced dowels 88 in the end closure members. The bore bus bar assembly is generally cylindrical in shape and may now be readily slid into the cylindrical housing 17 formed by the bore in the field shaft. The bore bus bars are held in place within the field, shaft 38 bore by the terminal assemblies 42. Because the bore bus bar assembly 14 is cylindrical in shape, it is relatively easy to maintain close dimensional tolerances between the bore conductor members 22 and 28 and insulating bore tube 41 even though the assembly is relatively long. The bore conductors form a cylinder approximately 3½ inches in diameter and 30 inches long. This is to be contrasted with the existing structure which utilizes lengths of angle iron spacers welded to a steel pipe, to hold the bore copper such that cooling air flows between the steel angles, steel pipe and bore of generator field shaft 38. Such a structure is difficult to fabricate and assemble. Also, in such a structure, it is extremely difficult to maintain close tolerances over the entire length, such that noise and vibration of the assembly moving within the field bore is a common concern and problem, particularly since these parts are simultaneously subjected to heating due to electrical current flow and the turbulence of cooling gas flow.

In the present invention, the cooling gas passes directly within the bore copper without loss of heat by contact with the spacers and the housing. Moreover, the cooling gas flow is localized such that for a given cooling gas flow the velocity is increased, providing improved heat transfer and cooling. Since the electrical resistance of copper is directly related to its temperature, increased cooling of the copper bore conductors 22 and 28 lowers their electrical resistance such that the power loss and heating due to current flow is lower than would be with higher resistance.

The cooling gas flow path and cycle through the bore bus bar assembly 14 can best be understood through reference to FIGS. 1, 2A, 2B and 5 in which arrows show the general flow path of the cooling gas. Referring to FIGS. 1, 2A, 2B and 5, cooling gas from the cooling unit 2 passes through piping 8 to be delivered through bore pack exciter 3 to the bore bus bar assembly 14. The cooling gas then flows through the slotted ports 51 and 52, or through the circular passages or ports 67, 68 and 69 into the axial gas passages 62 and 72, respectively, in the bore conductor members 22 and 28, respectively, to flow inside along the length of, and for direct cooling of, the bore copper members. The cooling gas exits the bore copper members at the other end through the semicircular openings 78 and 79 and through the gas exit openings 82 in the insulating tube 41 to the opening 83 in field shaft 38 to the interior of generator 1 where it joins the generator cooling gas for return to, and recycling by, the cooling unit 2. The cooling unit 2 then extracts heat and returns the cooling gas back to the bore pack exciter 3 and power generator 1 for a new cooling cycle.

It can thus be seen that the present invention provides improved cooling for the bore bus bars in an integrated bore pack exciter and electric power generator which is less complex, lighter and smaller than existing equipment. In addition, the present invention is simple to assemble and to maintain close tolerances to minimize noise and vibration, while at the same time providing improved direct, high velocity cooling of the bore connectors.

While the present invention has been described with respect to certain preferred embodiments thereof, it is to be appreciated and understood that numerous variations in the details of construction, the arrangement and combination of parts, and the type of material used may be made without departing from the spirit and scope of the invention.

What we claim is:

1. A cooling system for cooling core conductors in an electric power generator system of the type including an electric power generator and an exciter for providing direct current power to a generator field comprising:

at least two elongated bore conductors electrically connecting said exciter to the field of the generator;

insulation separating said bore conductors and extending at least coextensively therewith;

a substantially cylindrical housing surrounding said bore conductors and said insulation;

means to provide cooling gas to the interior of one end of said housing;

wherein said bore conductors are each substantially in the shape of a half cylinder including a flat portion, such that in combination with said insulation they form a cylinder to thereby facilitate the insertion of said bore conductors and said insulation in said housing; wherein support members within an opposite end of said housing support one end of said insulation; and wherein an insulating sleeve is positioned within said housing to separate and insulate said bore conductors from said housing;

said bore conductors each housing an axially extending slot through a surface adjacent to said insulation to form a cooling gas passage defined in part by said insulation;

At least one entrance opening in each of said bore conductors connecting the cooling gas in the interior of said one end of said housing to each cooling gas passage;

at least one exit opening in an opposite end of each of said bore conductors connecting each cooling gas passage to the outside of the respective bore conductor; and means to direct said cooling gas out of said housing;

whereby cooling gas can flow through each cooling gas passage within, and in direct contact with, the respective bore conductor.

2. The cooling system of claim 1 wherein electrical connection to said bore conductors is made through laminations which support and connect the bore conductors at said one end of said housing to said exciter.

3. The cooling system of claim 1 wherein said bore conductors, said insulation, and said support members are adapted to be assembled before insertion into said housing.

4. The cooling system of claim 3 wherein at least one of said entrance openings is in the shape of a slot having a substantially rectangular cross section.

5. The cooling system of claim 3 wherein at least one of said entrance openings is in the shape of a cylinder of circular cross section.

6. The cooling system of claim 3 wherein an opening in said housing in the region of said opposite end allows said cooling gas to exit said housing.

7. The cooling system of claim 3 wherein a connector assembly in said opposite end is adapted to connect each of said bore conductors to the field of said power generator to provide direct current power to said field.

8. The cooling system of claim 1 wherein the ends of the flat portions of said half cylinders are formed to provide notches along the length of the cylinders where the circumferences of said half cylinders meet said insulation.

9. The cooling system of claim 3 wherein said cylinder is approximately 3½ inches in diameter and 30 inches long.

10. A cooling system for cooling bore conductors in an electric power generation system of the type including an electric power generator and a bore pack exciter for providing direct current power to a field winding of said generator comprising:

at least two bore conductors electrically connecting said bore pack exciter to the field winding of said generator;

insulation separating said bore conductors;

a housing surrounding said bore conductors and said insulation with at least one end of said housing being positioned within said generator, a connector assembly in said one end connects each of the bore conductors to opposite ends of said field winding of said generator;

a cooling unit to provide cooling gas flow to the interior of said generator for cooling said generator before return to said cooling unit for recycling and also providing cooling gas to the end of said housing remote from said one end;

each of said bore conductors having a axially extending slot through the surface adjacent to said insulation to form a cooling gas passage in cooperation with said insulation;

wherein each of said bore conductors is substantially in the shape of a half cylinder including a flat portion such that in combination with said insulation they form a cylinder with axial bores in the central region thereof, said housing being of cylindrical shape to facilitate the insertion of said bore conductors and said insulation;

ends of the flat portions of said half cylinders are formed to provide notches along the length of said half cylinders where their circumference meet their insulation.

at least one entrance opening in each of said bore conductors connecting said cooling gas at said remote end to said cooling gas passageway;

at least one exit opening in the end of each of said bore conductors in said one end of said housing connecting said cooling gas passages to the outside of said bore connectors;

said cooling gas flowing out of said housing into said generator for return to said cooling unit along with said cooling gas flow provided to the interior of said generator;

whereby cooling gas can flow through said cooling gas passages within, and in direct contact with, said bore conductors.

11. The cooling system of claim 10 wherein an insulating sleeve is positioned within said housing to separate and insulate said bore conductors from said housing.

12. The cooling system of claim 11 wherein a pair of support members support an end of said insulation which extends beyond said bore conductors within said one end of said housing.

13. The cooling system of claim 12 wherein electrical connection to said bore conductors from said bore pack exciter is made through laminations on opposite sides of said insulation which also support said bore conductors within said housing.

14. The cooling system of claim 12 wherein said bore conductors, said insulation, and said support members are adapted to be assembled before insertion into said housing.

15. The cooling system of claim 14 wherein at least one of said entrance openings is in the shape of an alongated slot having a substantially rectangular cross section.

16. The cooling system of claim 14 wherein at least one of said entrance opening is in the shape of a cylinder of circular cross section.

17. The cooling system of claim 14 wherein an opening in said housing in the region of said one end allows said cooling gas to exit said housing.

18. The cooling of claim 16 wherein said support members are partially circular in shape to conform to the interior of said insulating sleeve.

19. The cooling system of claim 18 wherein said laminations have surfaces formed at substantially right angles to each other with one surface of each connected to a bore member; and
the other surfaces of which are each fastened to the bore conductors at the end of the bore pack exciter.

20. The cooling system of claim 19 wherein the ends of said other surfaces support said bore conductors within said housing of said exciter.

21. The cooling system of claim 13 wherein said support members are partially circular in shape to conform to the interior of said insulating sleeve.

22. The cooling system of claim 21 wherein said laminations have surfaces formed at substantially right angles to each other with one surface of each connected to a bore member;
the other surfaces of which are each fastened to the bore conductors at the end of the bore pack exciter adjacent said bore conductors.

23. The cooling system of claim 22 wherein said support members are partially circular in shape to conform to the interior of said insulating sleeve.

24. The cooling system of claim 12 wherein said cylinder is approximately $3\frac{1}{2}$ inches in diameter and 30 inches long.

* * * * *